United States Patent
York 4,040,720
Aug. 9, 1977

[54] FERROELECTRIC LIQUID CRYSTAL DISPLAY

[75] Inventor: Paul K. York, Placentia, Calif.

[73] Assignee: Rockwell International Corporation, El Segundo, Calif.

[21] Appl. No.: 570,115

[22] Filed: Apr. 21, 1975

[51] Int. Cl.² ............................................. G02F 1/13
[52] U.S. Cl. ..................... 350/160 LC; 340/166 FE; 340/173.2
[58] Field of Search ............... 340/166 EL, 166 FE, 340/173 LT, 173.2, 324 M; 350/160 LC

[56] References Cited

U.S. PATENT DOCUMENTS

| 3,079,591 | 2/1963 | Anderson | 340/173.2 |
| 3,725,899 | 4/1973 | Greubel | 340/324 M |

*Primary Examiner*—Edward S. Bauer
*Attorney, Agent, or Firm*—H. Fredrick Hamann; G. Donald Weber, Jr.; Robert Ochis

[57] ABSTRACT

A ferroelectric liquid crystal display device employs capacitance spoiling layers to minimize unneeded capacitances created by crossovers of "X" and "Y" address lines and to accurately define desired capacitances. The spoiler layers comprise low dielectric constant layers which space electrodes from the ferroelectric at crossover points where capacitance is not needed for device operation.

3 Claims, 7 Drawing Figures

FERROELECTRIC LIQUID CRYSTAL DISPLAY

The invention described herein was made in the performance of work under NASA Contract No. NAS 1-12228 and is subject to the provisions of Section 305 of the National Aeronautics and Space Act of 1958 (72 Stat. 435; 42 U.S.C. 2457).

BACKGROUND OF THE INVENTION

1. Field of the Invention

The invention relates to liquid crystal displays and more particularly to ferroelectric liquid crystal displays.

2. Prior Art

Prior art ferroelectric liquid crystal displays have utilized sets of parallel X electrodes and sets of parallel Y electrodes with the X and Y electrodes oriented at 90° with respect to each other for addressing the displays. A display point is generated at each point at which an X electrode and a Y electrode cross each other.

Such displays suffer either from slow write time for each element which results in a slow overall write time for the entire display or generate relatively small display areas separated by relatively large nondisplay areas. Further, prior art devices, particularly those employing memory characteristics of the ferroelectric require excessively tight tolerances fabricating the devices. Further, prior art devices require excess power to drive the devices.

SUMMARY OF THE INVENTION

The problems of the prior art devices are overcome by this invention. A unit display cell of a ferroelectric liquid crystal display device comprises a ferroelectric layer having an X electrode which extends across a plurality of the unit display cells and a supplementary electrode which is restricted to the unit display cell on a first side of the ferroelectric; the ferroelectric layer also has a Y electrode which is continuous over a plurality of unit display cells and a supplementary electrode which is restricted to the unit display cell on the second side of the ferroelectric. Each of these four electrodes make contact with the ferroelectric within the unit display cell. In addition to these electrodes, the unit display cell utilizes a distribution electrode which contacts the supplementary electrode on the side of the ferroelectric toward the liquid crystal in order to provide a unit cell having a maximum display area. A capacitance spoiler layer is interposed between an X or Y electrode and the ferroelectric material in the area where the X and Y electrodes cross in order to minimize the capacitive loading on the driver circuitry by this unneeded capacitance. The capacitance spoiler layer is also preferably utilized to accurately define the area of contact between the ferroelectric and a conductor which comprises one electrode of a capacitor.

DETAILED DESCRIPTION OF THE PREFERRED EMBODIMENT

Figure 1:
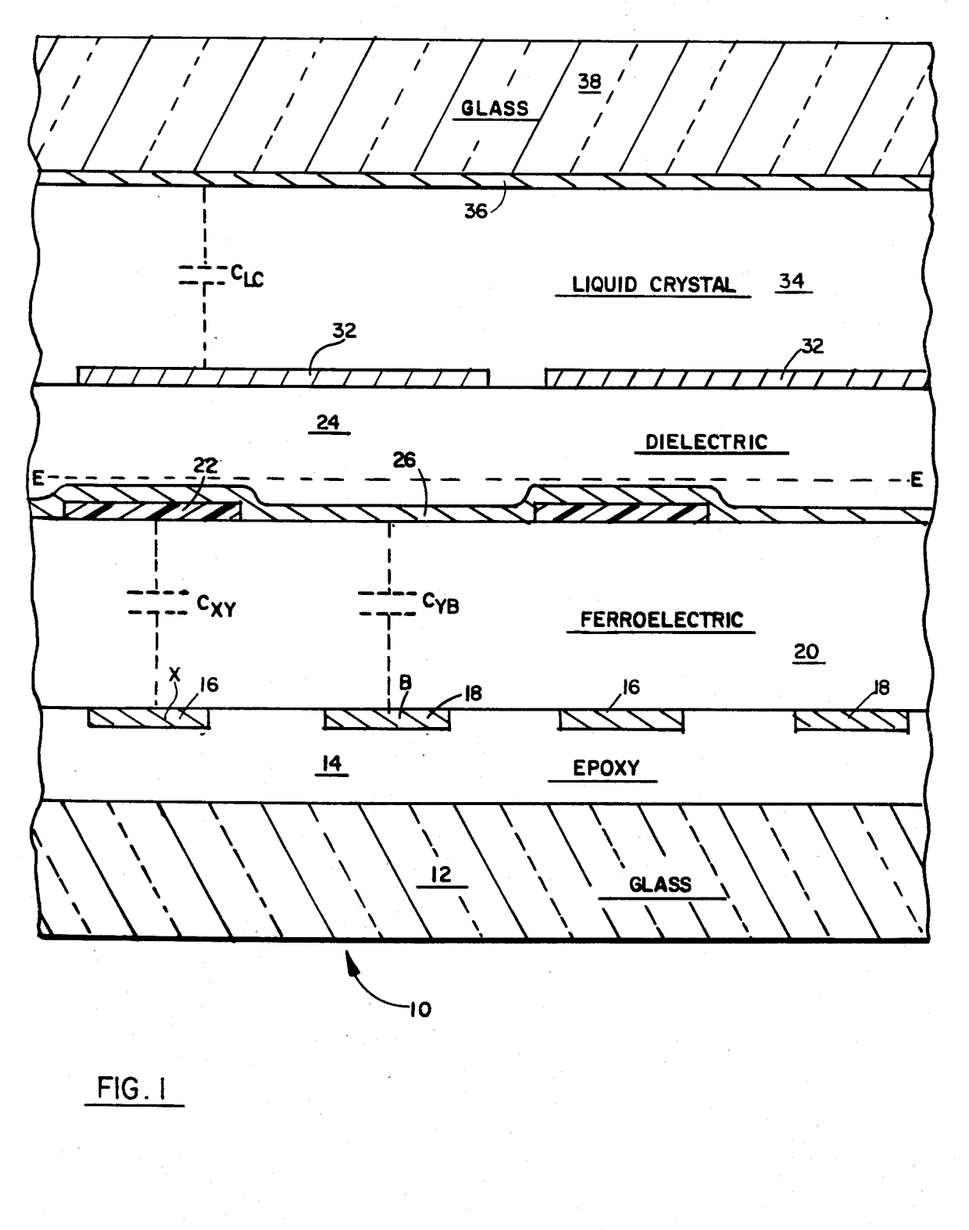
FIG. 1 is a cross-section through a ferroelectric liquid crystal display constructed in accordance with the invention.
Figure 2:
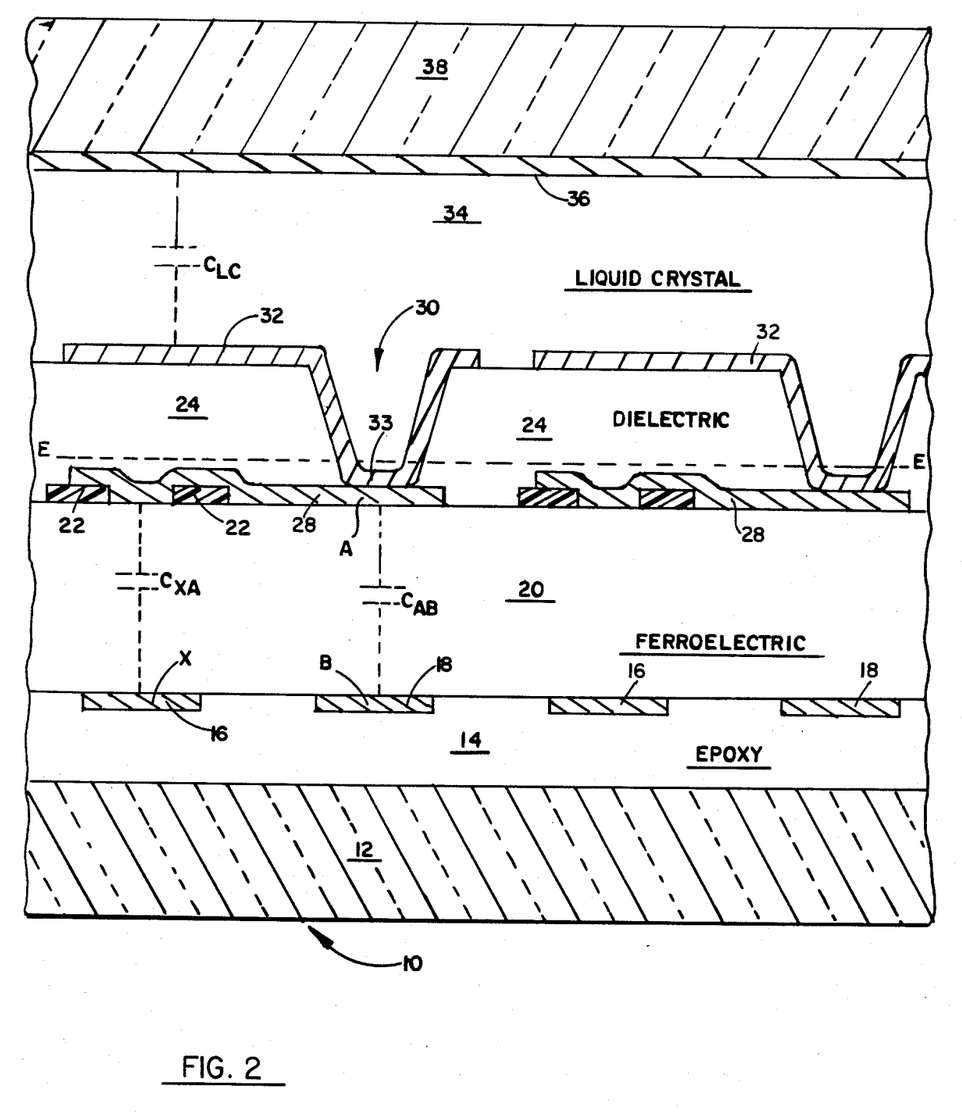
FIG. 2 is a cross-section through a ferroelectric liquid crystal display array constructed in accordance with the invention. The cross-section in FIG. 2 is taken along a line parallel to but displaced from the line along which the cross-section in FIG. 1 is taken.
Figure 3:
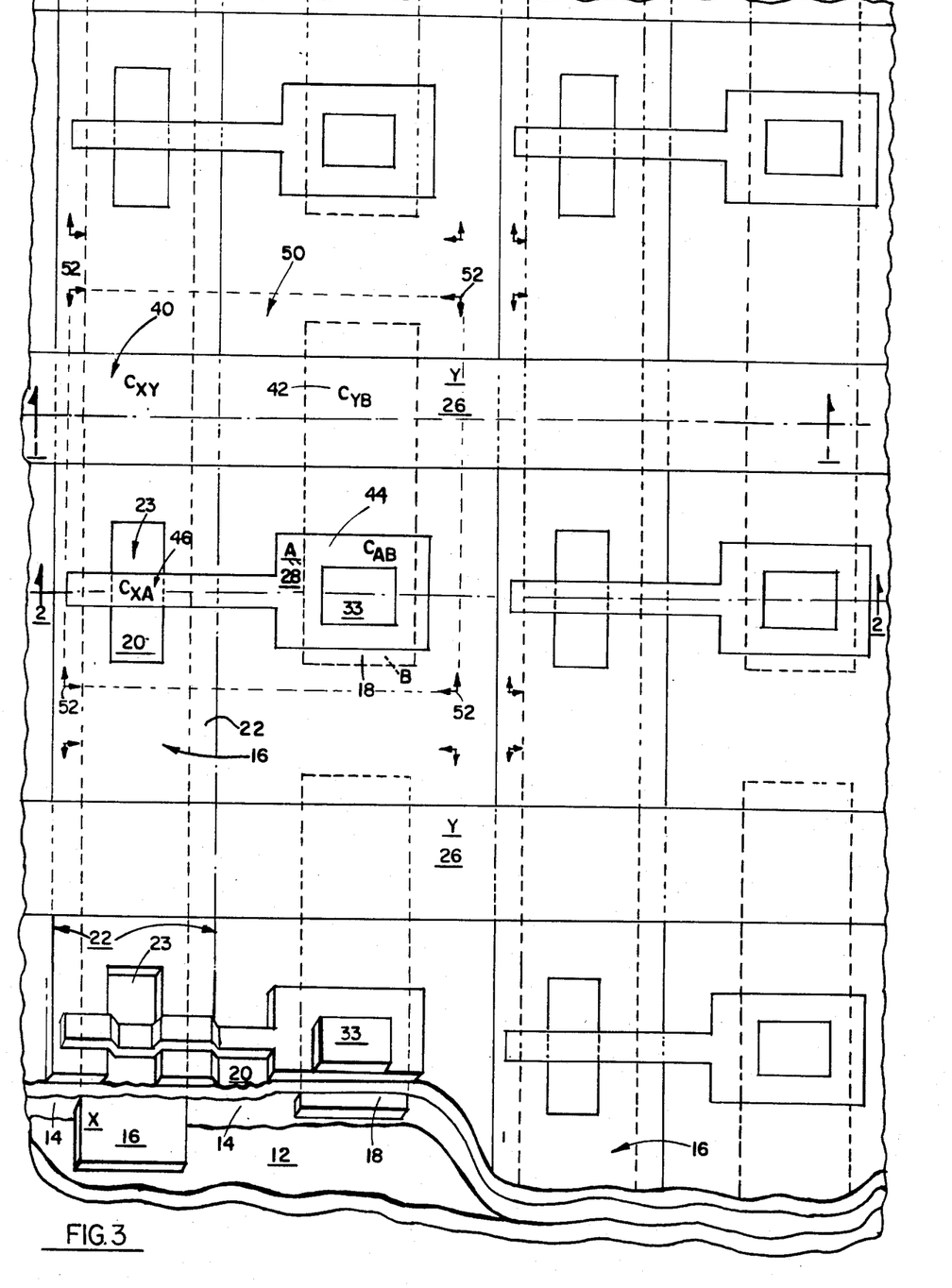
FIG. 3 is a plan view of a ferroelectric liquid crystal display constructed in accordance with the invention illustrating the relationships of elements present within a selected portion of the thickness of the device and the locations in which the cross-sections of FIGS. 1 and 2 are taken.

A preferred embodiment 10 of a ferroelectric liquid crystal display device in accordance with this invention is illustrated in cross-section in FIGS. 1 and 2, the cross sections of FIGS. 1 and 2 being taken along lines 1—1 and 2—2 in FIG. 3, respectively. Display device 10 preferably comprises a plurality of substantially identical unit display cells arranged to form a matrix or mosaic with each unit cell comprising an element within the mosaic of the display. Display device 10 is a layered structure having internal electrodes which control activation of individual unit display cells. Device 10 includes a backing plate 12 which has an upper surface on which an adhesive layer 14 is disposed. Adhesive layer 14 bonds an overlying layer 20 of ferroelectric material to backing plate 12. A plurality of X electrodes 16 are disposed between adhesive 14 and ferroelectric layer 20. These electrodes are preferably disposed substantially parallel. X electrodes 16 are in electrical contact with the ferroelectric at least at those locations where significant capacitance is required for proper device operation. Each X electrode 16 preferably extends through a plurality of unit display cells in order to minimize the number of external contacts required to address each of the display cells individually and to minimize internal wiring within the display device. A plurality of supplementary electrode 18, hereinafter sometimes referred to as "B" electrodes, are also disposed between adhesive 14 and ferroelectric layer 20. Each electrode 18 is preferably disposed between two adjacent X electrodes and in contact with the ferroelectric layer. The electrodes 18 are each restricted to a single unit display cell.

A plurality of capacitive spoiler layers 22 overlie the ferroelectric layer 20. Each layer 22 preferably extends through a plurality of unit display cells and is aligned parallel to and in registration with the X electrodes 16 which underlie ferroelectric layer 20. Spoiler layers 22 are preferably substantially wider than the X electrodes 26 in order to minimize registration problems. A hole 23 extends (FIG. 2) through spoiler layer 22 over a portion of the underlying X electrode in order to avoid completely spoiling the capacitance at that location.

A plurality of Y electrodes 26 overlie ferroelectric layer 20 and make contact therewith except where the electrodes 26 are spaced from the ferroelectric by the capacitance spoiler layers 22. Each Y electrode 26 preferably extends through a plurality of unit display cells. Within each unit display cell 50, the Y electrode is disposed over a portion of spoiler layer 22 which prevents the Y electrode from contacting the ferroelectric over the underlying X electrode.

A plurality of supplementary electrodes 28 (FIG. 2) hereinafter sometimes referred to as "A" electrodes overlie the ferroelectric layer 20. Each A electrode 28 is preferably disposed between two adjacent Y electrodes. The A electrode 28 overlies X electrode 16, within hole 23 in spoiler layer 22. This limits and defines the contact area between ferroelectric 20 and electrode A at the overlap with the X electrode. Each A electrode 28 is restricted to a single unit display cell and has the lower surface thereof in contact with ferroelectric layer 20 except where it is spaced therefrom by spoiler layer 22.

A dielectric layer 24 overlies ferroelectric layer 20, capacitance spoiler layer 22, a Y electrode 26 or an A electrode 28. Dielectric layer 24 is in contact with ferroelectric layer 20, except where it is spaced therefrom by layer 22 of electrodes 26 or 28. Contact holes 30 extend through dielectric layer 24 so that a portion of each A electrode 28 is not covered by the dielectric layer 24.

Distribution or display electrodes 32 overlie dielectric 24 to effect control of the display area of the matrix whose display state is controlled by the unit cell. Each distribution electrode 32 extends down into the contact hole 30 in dielectric layer 24 overlying the A electrode of its unit cell and make contact with the A electrode 28 as illustrated at 33 (FIG. 2). The distribution electrodes 32 are illustrated as lying directly above the underlying electrodes of the individual unit cell. This orientation is preferred. However, it will be understood that the display area defined by distribution electrode 32 can be partially displaced from the underlying controlling unit cell so long as the distribution electrode is in electrical contact with the A electrode within the corresponding unit cell.

The area above dielectric layer 24 and distribution electrodes 32 is filled with a liquid crystal material. A transparent electrode 36 overlies the liquid crystal material and is supported by a front or viewing plate 38 which comprises the front of display device 10.

Display device 10 is sealed at the edges to prevent loss of the liquid crystal material and to prevent contamination of the liquid crystal by the ambient environment. For displays having a relatively small area, the sealing of the display at the side may be utilized to control the spacing of the viewing plate 38 from the distribution electrodes 32. In larger displays it may be necessary to include spacers (not shown) between the dielectric layer 24 and the viewing plate 38 in order to prevent the viewing plate 38 from being displaced too close to or too far from the distribution electrodes 32.

A plan view of a portion of the matrix or mosaic display of FIGS. 1 and 2 is illustrated in FIG. 3. In the interest of clarity, only those features of the unit cell which occur below the lines E—E in FIGS. 1 and 2 are illustrated in this plan view. A unit display cell 50 has its corners and boundary lines indicated by arrows 52. The arrows 52 also mark the corners of the distribution electrode 32 of the unit cell (see FIG. 4). In the interests of clarity, only the contact area 33 of the distribution electrode 32 is illustrated in FIG. 3.

Referring now to FIG. 3, it can be seen that within each unit display cell 50, the Y electrode 26 crosses over the underlying X electrode 16 and thereby forms an overlap area 40 which may be also referred to as overlap area XY. Y electrode 26 also crosses over the underlying B electrode 18 thereby forming an overlap area 42 which may also be referred to as the YB overlap area.

Similarly, within each unit display cell 50, the A electrode 28 crosses over the underlying B electrode 18 thereby forming an overlap area 44 which may be referred to as the AB overlap area. The A electrode 28 also crosses over the underlying X electrode 16 to form an overlap area 46 which may be referred to as the XA overlap area. Because the overlapping conductors are insulated from each other by dielectric material, a capacitor is formed at each of the overlap areas XY, YB, AB and XA. These capacitors may be designated $C_{XY}$, $C_{YB}$, $C_{AB}$ and $C_{XA}$, respectively. The locations of these capacitors are indicated on FIGS. 1, 2 and 3.

Figure 4:
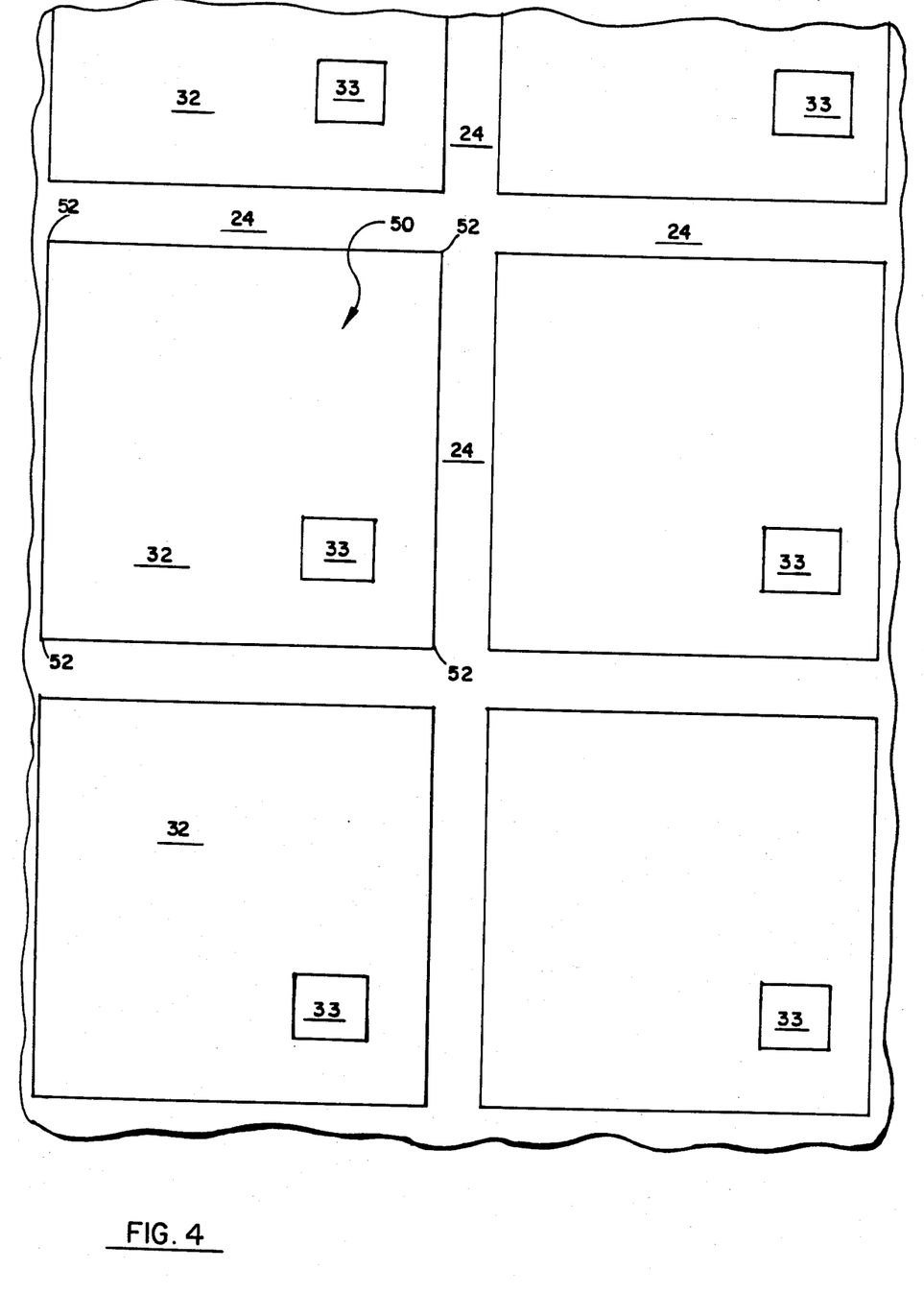
FIG. 4 is a plan view of a portion of a ferroelectric liquid crystal display array illustrating those portions of the array which may be activated and those portions of the array which may not be activated.

The mosaic pattern of the display is illustrated in FIG. 4, where a small portion of a display device is illustrated in plan view. The unit display cell 50 defines a display area which may be activated to display information. The activatable display area is restricted to the area of the distribution electrode 32 associated with the display unit cell. For clarity, the contact area 33 at which the distribution electrode 32 makes contact to the A electrode 28 is illustrated. It will be understood, that the location of the area 33 within distribution electrode 32 may be varied significantly without effecting the operation or appearance of the device (provided the pattern of distribution electrodes is not changed). The only effect is to displace the active display areas relative to the underlying control unit cell. The individual mosaic units of the display are spaced from each other by narrow strips of the dielectric layer 24 which are exposed between the distribution electrodes 32. These narrow strips are not activatable.

Backing plate 12 may preferably be glass and adhesive 14 may preferably be epoxy. In a display device 10 which is operated only in a reflective mode, the X, Y, A and B electrodes (16, 26, 28 and 18) may be made of any appropriate conductive material and may preferably be gold, aluminum or silver. The ferroelectric is preferably lead zirconate titanate (PZT) or lead zirconate titanate doped with lanthanum (PLZT). Where a PLZT ferroelectric is utilized, the entire display structure may be made transparent and thus made operable in a transmission or projection mode. In a transmission mode display the electrodes 16, 18, 26, 28 and 32 must be transparent and are preferably formed of indium tin oxide. With non-transparent ferroelectrics, the display is restricted to operation in the reflective mode, in which the reflection of incident light is controlled by the state of the liquid crystal. In those displays which do not operate in a transmissive mode, the distribution electrodes 32 are preferably gold or some other highly reflective conducting material in order to obtain high contrast between active and inactive display areas. The capacitance spoiler layers 22 are preferably formed of a polyimide film. The dielectric layer 24 may also be formed of polyimide. The transparent front electrode 36 is preferably indium tin oxide, although any other transparent electrode material which is compatible with the liquid crystal may be utilized.

The ferroelectric is preferably 75–100 microns thick and the capacitance spoiler layers are preferably 1 micron thick. The liquid crystal material is preferably a dynamic scattering material such as doped EB-BAMBBA and the spacing between the main body of the distribution electrodes 32 and the front electrode 36 is preferably 13 microns.

CONSTRUCTION

The preferred embodiment of the invention may be constructed in the following manner. A ferroelectric layer 20 of appropriate thickness may be coated on one side with a conducting material from which the X and B electrodes, 16 and 18, are to be formed. The area of the X and B electrodes may then be defined through use of a photoresist and mask to produce a protective layer over the X and B electrodes. The intervening conductive material is then removed by etching. After the electrodes 16 and 18 have been defined, a layer of adhesive 14 which may preferably be epoxy is applied over the X and B electrodes and the backing plate 12 which may preferably be glass is applied to the adhesive. Once the adhesive has cured sufficiently, the structure may be inverted and the portion of the display which is illustrated as being above the ferroelectric layer in FIGS. 1 and 2 may be formed. The capacitance spoiler layers 22 may preferably be formed by depositing a layer of capacitance spoiling material such as polyamide across the entire upper surface of the ferroelectric layer 20. The spoiler layers may then be defined through use of a photoresist and mask to provide a protective layer over the portions of the layer of spoiler material which are to form spoiler layers 22. The intervening polyamide or other material which is not needed as spoiler layers 22 is then removed through etching prior to curing the polyimide. The polyimide is then cured by heating. the conducting material which is to form the Y and A electrodes 26 and 28 is preferably deposited in a continuous sheet over the ferroelectric and the cured capacitance spoiling layers. The A and Y electrodes are then defined on the conductive layer through use of photoresist and a mask and the undesired conductive material is removed through etching. The dielectric layer 24 is then deposited. The contact holes 30 through the dielectric layer 24 may be formed through use of photoresist, mask and etching techniques. The conductive material to form the distribution electrodes 32 is then deposited over the dielectric layer 24 and the distribution electrodes are defined through a photoresist, mask and etching technique. Transparent conductor 36 is deposited on what will be the inside of front plate 38 of the display. The front plate 38 and conductor 36 are then disposed in a proper relationship to the distribution electrodes 32. The space between conductor 36 and electrodes 32 and dielectric 24 is then filled with the liquid crystal material 34 and the sides of the display sealed to prevent leakage of the liquid crystal material.

When it is desired to activate the display, each unit display cell is individually addressed by the X and Y electrodes in order to store the information to be displayed in the individual display cells. A line of display cells may be addressed by activating one Y electrode. Which unit display cells are to be activated on the selected row are then determined by the selection of the corresponding X electrodes.

Figures 5, 7:
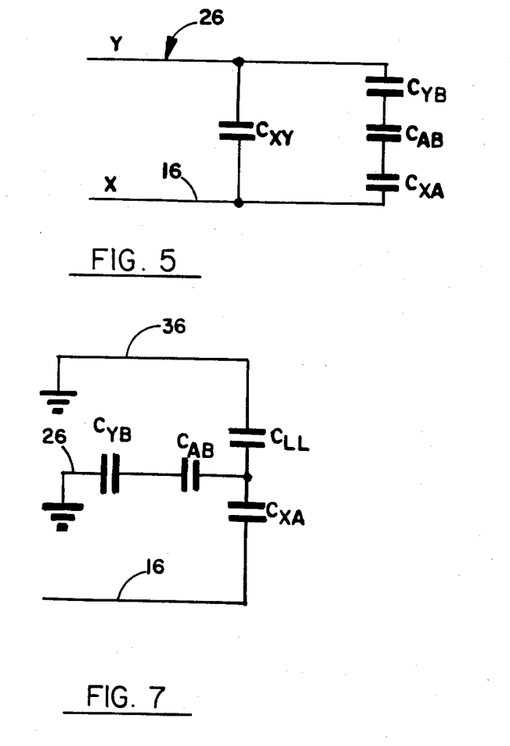
FIG. 5 is a circuit diagram of the equivalent circuit of a unit cell of a ferroelectric liquid display during cell addressing.
FIG. 7 is a circuit diagram of a display cell equivalent circuit during readout of the display.

An equivalent circuit for the unit cell during addressing is illustrated in FIG. 5. It will be noted, that this equivalent circuit consists of the capacitance $C_{XY}$ of the XY overlap area in parallel with the series combination of the capacitances $C_{YB}$, $C_{AB}$, $C_{XA}$ associated with the YB, AB, and XA overlaps, respectively. The capacitances $C_{YB}$, $C_{AB}$ and $C_{XA}$ are active capacitors which control the operation of the display. The capacitance $C_{XY}$ does not contribute to the performance of the device. $C_{YB}$ has substantially the same value as $C_{AB}$ because the areas of their overlaps are substantially identical and the dielectric material separating them is substantially identical.

The capacitance of $C_{XA}$ is substantially less than the capacitances of $C_{YB}$ and $C_{AB}$ because the A electrode 28 is considerably narrower where it overlaps X electrode 16 than it is where it overlaps the B electrode 18. Further, as is more clearly illustrated in FIG. 2, the A electrode 28 is spaced from ferroelectric layer 20 by capacitance spoiler layer 22 over part of the region where electrode A overlaps electrode X. This serves to further reduce the value of the capacitor $C_{XA}$ and to accurately define this value. The capacitance of $C_{XA}$ is preferably 1/10th of the value of the capacitance of $C_{YB}$ or $C_{AB}$.

The active capacitance which must be driven by the display addressing circuitry in a unit cell is the series combination of a capacitance $C_{YB}$, $C_{AB}$ and $C_{XA}$. As is well known, the equivalent capacitance $C_{ACTIVE}$ is:

$$C_{ACTIVE} = \frac{(C_{YB})(C_{AB})(C_{XA})}{(C_{YB})(C_{AB}) + (C_{YB})(C_{XA}) + (C_{AB})(C_{XA})} \qquad \text{Eq. 1}$$

where $C_{YB} = C_{AB}$ and $C_{XA} = 1/10\ C_{AB}$, Equation 1 reduces to:

$$C_{ACTIVE} = 1/12\ (C_{AB}) \qquad \text{Eq. 2}$$

Figure 6:
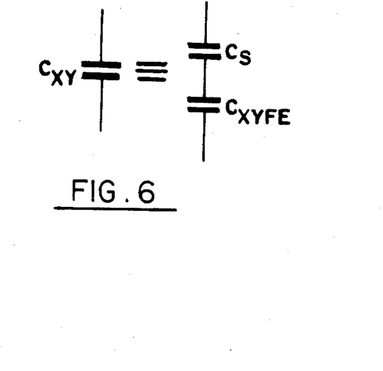
FIG. 6 is a circuit diagram of the equivalent circuit of a capacitor in the circuit diagram in FIG. 5.

Since capacitor $C_{XY}$ provides no useful function in display device 10, it represents an undesirable load on the drive circuitry which drives the X and Y electrodes. Consequently, it is desirable to reduce the capacitance value of $C_{XY}$ in order to reduce the loading on the driver circuitry, thereby reducing the power requirements for driving the display and possibly simplifying the driver circuitry. Reducing the capacitance value of $C_{XY}$ also has the advantage that the time constant of the circuit is reduced so that faster rise time pulses can be used to write information into the ferroelectric. If the Y electrode and the X electrode were both directly applied to the ferroelectric layer 20 at the location of the XY crossover, then capacitor $C_{XY}$ would have a capacitance value which was substantially the same as the values of the capacitors $C_{YB}$ and $C_{AB}$ and the drive circuitry would have to drive a non-functional capacitor which would be 12 times as large as the active or functional capacitor, thus unreasonably large amounts of power would be required. However, the value of the capacitance $C_{XY}$ is greatly reduced by the spoiler layer. As illustrated in FIG. 6, the capacitance $C_{XY}$ as an equivalent circuit of a capacitor $C_S$ due to the spoiler layer in series with a capacitor $C_{XYFE}$ due to the ferroelectric. The capacitance $C_{XYFE}$ is substantially the same as the capacitances $C_{YB}$ and $C_{AB}$. However, the capacitance $C_{XY}$ which appears in the equivalent circuit of FIG. 5 is equal to:

$$C_{XY} = \frac{(C_S)(C_{XYFE})}{(C_S + C_{XYFE})} \qquad \text{Eq. 3}$$

Ferroelectric materials have a dielectric constants on the order of 2,000. The spoiler layer 22 preferably has a dielectric constant of about 4. Thus, if the ferroelectric and the spoiler layer were of equal thickness, the capacitor $C_S$ would have a value of about 1/500th of the value of the capacitor of $C_{XYFE}$. However, keeping spoiler layer 22 thin minimizes problems in depositing the A and Y electrode thereover. Therefore, since satisfactory operating characteristics are obtained thereby, spoiler layer 22 is preferably only made thick enough to reduce $C_{XY}$ to about 1/20th of $C_{AB}$. Since the value of spoiled capacitor $C_{XY}$ is on the order of or smaller than about (1/20)($C_{AB}$) and $C_{ACTIVE}$ is about (1/12)($C_{AB}$) substantially more than half the power supplied by the address drivers is consumed by the active capacitances of the unit cell. If it were considered necessary, the value of the capacitance $C_{XY}$ could be further reduced by increasing the thickness of the spoiler layer 22 to further reduce the value of the capacitance $C_S$ and thus the value of the capacitance $C_{XY}$.

For operation the ferroelectric must be polarized in the area $C_{XA}$, either in one direction or the other. The directional polarization depending on the polarity of the voltages to be applied. During addressing, the state of the ferroelectric in the area of $C_{XA}$ associated with a display cell which is not to be activated is left unchanged. In a display cell which it is desired to activate or excite, the ferroelectric associated with capacitor $C_{XA}$ must have its polarization reversed during the writing period. Polarizing the ferroelectric induces memory in the ferroelectric through its inherent hysteresis which causes the ferroelectric to remain in the reverse polarized state. Thus, the capacitance $C_{XA}$ is utilized to store the information to be displayed. The row of the display to be addressed is selected by applying a voltage of $+V_T$ volts to the Y electrode associated with that row and by applying a voltage of $+V_T/2$ volts to all the other Y electrodes. For the device parameters given above, $V_T$ is preferably about 125 volts.

An individual unit display cell within the selected row is selected for activation by grounding the X electrode associated with that cell. The X electrodes associated with unselected unit display cells have a voltage of $+V_T$ volts applied thereto. Pulses of 20 μsec duration are sufficient to revise the polarization of selected cells.

These applied voltages have the desired effect of reversing the polarization of the ferroelectric associated with $C_{XA}$ is selected cells of the selected row and leaving the polarization of the rest of the ferroelectric unchanged.

The above applied voltages apply a voltage $V_{C_{XA}}$ across the capacitor $C_{XA}$ in a selected cell:

$$V_{C_{XA}} = \frac{1/C_{XA}}{1/C_{AB} + 1/C_{YB} + 1/C_{XA}} V_T \quad \text{Eq. 4}$$

Equation 4 reduces to:

$$V_{C_{XA}} = \frac{C_{AB} C_{YB}}{C_{YB} C_{XA} + C_{AB} C_{XA} + C_{AB} C_{YB}} V_T \quad \text{Eq. 5}$$

where $C_{AB} = C_{YB} = 10 C_{XA}$, this Equation 5 yields $$V_{C_{XA}} = \frac{5V_T}{6} \quad \text{Eq. 6}$$

Thus, 5/6 of the applied voltage appears across $C_{XA}$. For a properly selected applied voltage, $V_T$ the voltage across $C_{XA}$ is sufficient to polarize the ferroelectric of $C_{XA}$ but not sufficient to polarize $C_{YB}$ or $C_{AB}$. Each unselected cell in the selected row has no voltage applied there across. Each cell in an unselected row has a voltage of $+V_{T/2}$ applied to it. However, the resulting voltage across the capacitances $C_{XA}$ in the unselected rows is insufficient to reverse the polarization of the ferroelectric associated with the capacitances $C_{XA}$ in the unselected rows. Consequently as intended only the capacitors $C_{XA}$ of selected cells have their polarization reversed.

After removal of the writing voltages from the X and Y electrodes the capacitors $C_{XA}$ of selected cells remain reverse polarized and thus have a substantial charge stored thereon. Each row of the matrix is written in succession in the same manner. During the writing period, transparent front electrode 36 is held at $+V_{T/2}$ volts to prevent writing voltages from activating the liquid crystal display.

After all of the cells within the display have been written, the information stored in the capacitors $C_{XA}$ is read out as a display in the liquid crystal material in the following manner.

A large positive voltage pulse of $V_T$ volts of approximately 1.5 milliseconds duration is applied to all of the X electrodes 16 while the Y electrodes are grounded and the transparent electrode 36 on the inside of viewing surface of the device is held at ground voltage. Under these conditions, the equivalent circuit of each unit display cell is as shown in FIG. 7. Thus, the equivalent capacitance of the unit display cell is the capacitance of capacitor $C_{XA}$ (which value depends on whether $C_{XA}$ has been polarized) in series with a combination of $C_{YB}$ and $C_{AB}$ in series paralleled with capacitance $C_{LC}$ where $C_{LC}$ is the capacitance associated with the liquid crystal. The capacitance of capacitor $C_{XA}$ must be greater than the capacitance of the liquid crystal in order to provide an output to the liquid crystal material which is adequate to excite the liquid crystal between distribution electrode 32 and electrode 36. The application of the voltage to the X electrodes has substantially no effect on those unit display cells into which information was not written during the writing or storage portion of the cycle because it merely tends to maintain the polarization of these cells. However, in those unit cells in which information was written into the cell during the writing or storage period, the pulse on the X electrode causes the polarization of the ferroelectric to reverse sign thereby providing a substantial charge to the distribution electrode 32. This charge combined with the voltage which is applied across the liquid crystal is sufficient to excite the liquid crystal, thereby resulting in a bright display for that unit cell (reflective mode). The display will take approximately 25 milliseconds to reach full contrast following the application of the read pulse to the X electrodes due to the characteristics of the liquid crystal. Upon removal of the drive voltage, the liquid crystal display will take approximately 50 milliseconds to decay. Thus, there is a period of 50 milliseconds in which the next display cycle of information can be written into the ferroelectric capacitances in preparation for the next read cycle and enable the display to provide a continuous display.

The operating characteristics of the device 10 are substantially immune to moderate misalignment errors in the masks which define the capacitance spoiling layers 22; the Y and A electrodes 26 and 28, the holes 30 in dielectric layer 24 and the distribution electrodes 32. The requirement on the positioning of the spoiler layers is that they shield the entire width of the X electrode and that the holes 23 in the spoiler layers be disposed entirely over the X electrodes. The Y electrodes must be disposed in such a manner that they overlap the B electrode in a manner which provides a maximum area for the YB overlap. The Y electrode must also be positioned such that they do not overlap the holes 23 in the spoiler layer. The A electrodes must be disposed to yield a maximum area for the AB overlap and such that the narrow portion of the A electrode extends entirely across the hole 23 and the capacitance spoiling layer and does not overlap the ends of the hole. So long as these requirements are met, a shifting of the mask which defines the A and Y electrodes will not alter the operational characteristics of the device. Similarly, the requirement with respect to the placement of the holes 30 through dielectric layer 24 is that the entire bottom of the hole be over the A electrode to provide a content area which is on electrode 28 for the formation of the contact 33 between the distribution electrodes 32 and the A electrodes 28. With respect to the placement of the distribution electrodes 32, the requirement is that the electrode 32 extend to the bottom of the hole 30 to provide a sufficient area of contact 33 between the distribution electrode 32 and the A electrode 28 and that two different distribution electrodes do not extend into the same hole in a manner which provides a short circuit between them or which interferes with proper photomask and etching definition of the electrodes.

Thus, the design of unit cell allows a wide tolerance for mask alignment thereby assuring a high yield of devices. Thus, a reliable, relatively low power ferroelectric memory liquid crystal display has been shown and described. It will be understood, that those skilled in the art will be able to modify the preferred structure, to select different materials for the ferroelectric, dielectrics, conductors, and liquid crystal. However, the preferred embodiment is intended to be illustrative only and is not limitive. Thus, the scope of the protection afforded this patent is defined only by the appended claims.

What is claimed is:

1. A ferroelectric liquid crystal display device having a plurality of unit display cells, said device comprising:
    a layer of ferroelectric material having an upper and a lower surface;
    a first plurality of electrodes disposed adjacent said lower surface of said layer of ferroelectric material, each electrode in said first plurality of electrodes extending across a plurality of unit display cells;
    a second plurality of electrodes disposed adjacent said lower surface of said layer of ferroelectric material, each electrode of said second plurality of electrodes being restricted to a single unit display cell;
    a third plurality of electrodes disposed adjacent to said upper surface of said layer of ferroelectric material, each electrode of said third plurality extending across a plurality of unit display cells;
    a fourth plurality of electrodes adjacent said upper surface of said layer of ferroelectric material, each electrode of said fourth plurality of electrodes being restricted to a single unit display cell;
    capacitance spoiler means disposed adjacent at least one of said upper and lower surfaces of said layer of ferroelectric material between said ferroelectric and said first or said third plurality of electrodes at those locations at which the electrodes of said first and third pluralities overlap;
    dielectric means disposed adjacent said upper surface of said layer of ferroelectric material, the electrodes of said third plurality of electrodes, and the electrodes of said fourth plurality of electrodes;
    a plurality of distribution electrodes overlying said dielectric means, each of said distribution electrodes in electrical contact with one of said fourth plurality of electrodes;
    a layer of liquid crystal material overlying said plurality of distribution electrodes;
    transparent electrode means overlying said layer of liquid crystal material;
    transparent face plate means overlying said transparent electrode means; and
    sealing means sealing the edges of said display device, thereby preventing leakage of said liquid crystal material.

2. The display device recited in claim 1 wherein said capacitance spoiler means is disposed on said upper surface of said layer of ferroelectric material.

3. The ferroelectric liquid crystal display device recited in claim 1 wherein each fourth electrode overlaps a first electrode and said capacitance spoiler means is disposed to space a portion of at least one of said first or fourth electrode in the area of the overlap from the ferroelectric material to define a restricted area of contact between the ferroelectric material and said at least one electrode to provide a defined capacitance between said first and fourth electrodes which is substantially fixed so long as said electrodes are not grossly misaligned.

* * * * *